United States Patent
Maness et al.

(10) Patent No.: US 9,705,780 B2
(45) Date of Patent: *Jul. 11, 2017

(54) NON-DISRUPTIVE INTEGRATED NETWORK INFRASTRUCTURE TESTING

(71) Applicant: International Business Machines Corporation, Armonk, NY (US)

(72) Inventors: Kenneth D. Maness, Round Rock, TX (US); Tracy H. Tarpey, Fuquay-Varina, NC (US); Marc A. Winsor, Herriman, UT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,816

(22) Filed: Jan. 19, 2017

(65) Prior Publication Data

US 2017/0126541 A1    May 4, 2017

Related U.S. Application Data

(63) Continuation of application No. 15/157,439, filed on May 18, 2016, now Pat. No. 9,559,934, which is a
(Continued)

(51) Int. Cl.
*G06F 15/173* (2006.01)
*H04L 12/26* (2006.01)

(52) U.S. Cl.
CPC .......... *H04L 43/50* (2013.01); *H04L 12/2697* (2013.01); *H04L 43/06* (2013.01);
(Continued)

(58) Field of Classification Search
CPC ............. H04L 12/2697; H04L 41/5003; H04L 41/5009; H04L 41/5038; H04L 43/50;
(Continued)

(56) References Cited

U.S. PATENT DOCUMENTS 6,629,269 B1    9/2003 Kahkoska
6,950,968 B1    9/2005 Parolari et al.
(Continued)

FOREIGN PATENT DOCUMENTS

DE      3706380 A1    9/1988

OTHER PUBLICATIONS

List of IBM Patents or Patent Applications Treated as Related, Appendix P, Filed Herewith.
Maness, et al., U.S. Appl. No. 14/538,942, filed Nov. 1, 2014.
Maness, et al., U.S. Appl. No. 14/974,396, filed Dec. 18, 2015.
Maness, et al., U.S. Appl. No. 15/157,439, filed May 18, 2016.
(Continued)

*Primary Examiner* — Kyung H Shin
(74) *Attorney, Agent, or Firm* — Daniel R. Simek

(57) ABSTRACT

Non-disruptive integrated testing of network infrastructure in which one or more processors of a first network interface device (NID) performs tests on a network cable connected to a first NID of a host system, and connected to a second NID. Tests verify connectivity of the cable, a bandwidth capacity baseline, and a maximum bandwidth of the network cable. A self-test determines the host operating system, host status, and operational status of the host NID, and responsive to changed conditions, NID settings are reverted to a pre-validated condition state, and confirmation of reverting is sent to the host. Network activity is suspended if received by the host ID during scheduled network cable tests. Upon completion of tests and storing of test results in NID memory network activity resumes. Results of the tests are transferred from memory of the first NID to persistent storage of the host system.

1 Claim, 4 Drawing Sheets

Related U.S. Application Data continuation of application No. 14/974,396, filed on Dec. 18, 2015, now Pat. No. 9,391,795, which is a continuation of application No. 14/538,942, filed on Nov. 12, 2014.

(52) U.S. Cl.
CPC ...... *H04L 43/0811* (2013.01); *H04L 43/0817* (2013.01); *H04L 43/0829* (2013.01); *H04L 43/14* (2013.01)

(58) Field of Classification Search
CPC ..... H04L 43/06; H04L 43/08; H04L 43/0811; H04L 43/0817; H04L 43/0829; H04L 43/0852; H04L 43/0888; H04L 43/0894; H04L 43/10; H04L 43/12; H04L 43/14
USPC ................... 709/224, 223; 370/252; 399/23; 714/43, 716
See application file for complete search history.

(56) References Cited

U.S. PATENT DOCUMENTS

| | | |
|---|---|---|
| 7,573,862 B2 | 8/2009 | Chambers et al. |
| 8,640,220 B1 | 1/2014 | Vincent et al. |
| 2009/0109864 A1 | 4/2009 | Wang et al. |
| 2009/0164626 A1 | 6/2009 | Roll et al. |
| 2010/0009576 A1 | 1/2010 | Schaffer et al. |
| 2010/0034116 A1 | 2/2010 | Lin |
| 2012/0089964 A1 | 4/2012 | Sawano |
| 2013/0272146 A1 | 10/2013 | Jones |
| 2013/0286874 A1 | 10/2013 | Lafleur et al. |
| 2014/0068032 A1 | 3/2014 | Kannan et al. |

OTHER PUBLICATIONS

Internet Society et al., "Benchmarking Methodology for Network Interconnect Devices (RFC2544)", IP.com Prior Art Databased Technical Disclosure, IPCOM000003130D, Original Publication Date: Mar. 1, 1999, IP.com Electronic Publication: Sep. 13, 2000, Copyright (C) The Internet Society (1999).

NON-DISRUPTIVE INTEGRATED NETWORK INFRASTRUCTURE TESTING

BACKGROUND OF THE INVENTION

The present invention relates generally to information technology component testing, and more particularly to network infrastructure testing.

Data Center infrastructure is often taken for granted, with assumptions being made for the performance of infrastructure components, such as network cables, without actually measuring, testing, or verifying that performance requirements are met or exceeded. Evaluations focusing on the network data transfer rates, retransmits, packet failure rates, and related information transfer over network infrastructure components often reveal a wide difference between expected and actual results of quality levels and proven performance.

One example of providing an accurate Information Technology (IT) infrastructure evaluation currently requires measuring copper cabling with specialized tools, applications, and trained specialists. Measuring the bandwidth and failure rate of network transmission medium such as category 5e, category 6, or similarly labeled infrastructure provides a more accurate information base to plan bandwidth-intensive production environments. Current approaches to network component testing involves external devices that require full access to the hardware, and in some cases, disconnection and reconnection of the component being tested. Network component testing, such as testing of network cables, for example, cannot be conducted while network components are operating in production environments.

SUMMARY

According to one embodiment of the present invention, a method, computer program product, and system for non-disruptive integrated testing of network infrastructure is provided. The method for non-disruptive integrated testing of network infrastructure provides for one or more processors of a first network interface device that performs a set of tests on a network cable of a network infrastructure, in which a first end of the network cable is connected to the first network interface device of a host system by a first cable connector, and a second end of the network cable is connected to a second network interface device by a second cable connector, in which the set of tests includes connectivity verification of the first end and the second end of the network cable, a bandwidth capacity baseline measurement of the network cable, and a maximum bandwidth measurement of the network cable. One or more processors performing a self-test in which a determination of a host operating system, host status, and an operational status of the network interface device, are performed, and in response to the self-test resulting in changed conditions, reverting settings of the network interface device to a previously validated condition state, and confirm reverting of the settings by sending a confirmation alert to the host computing device. one or more processors suspends network activity, which is received by the first network device of the host system, in response to initiating a set of tests on the network cable that are scheduled to be performed. One or more processors resume network activity which is suspended, in response to completion of the set of tests. One or more processors store results of the set of tests in a memory of the first network interface device, and one or more processors transmit the results of the set of tests from the memory of the first network interface device, to persistent storage of the host system.

DETAILED DESCRIPTION

Embodiments of the present invention recognize that network transmission hardware, such as network cables, may experience changes, degradation, and installation errors, contributing to network transmission conditions that do not meet expectations. Network cables, referred to herein as cables, for brevity, may experience inconsistency in construction and material quality, depending on manufacturing conditions. To attain high performance network data transmission, such as that in a data center, cables of high quality construction and high performance standards are desired. Often the cables are purchased and installed without being tested to determine the actual performance of the cables, and determine any detrimental effects of installation. If testing is performed, it is done by disconnecting the cable from the network interface device, such as a network interface card (NIC), also known as a network interface controller. The cable is attached to a separate testing device and the actual in-situ performance of the network cable is unknown. Further, reconnecting cables that have been tested, may be done inadequately, improperly, and/or damaging to the cable or interface and the resulting performance impacts may remain unknown.

Embodiments of the present invention provide a method, computer program product and apparatus, for testing network transmission cables, embedded within a network interface device of a host system, to which the network cable is connected, without disruption of network activity of the host system. Embodiments of the present invention include in the network interface device, for example, a network interface card, the hardware components and software instructions to perform testing on the network cable connected to the network interface device. The network interface device includes the processor hardware to execute the cable tests, and the software program instructions, included on memory modules associated with the network interface device, to execute the tests, receive and analyze the test results, and generate a report of the test results. Some embodiments perform testing of the network cables without disruption to the network activity requests or receipts of the network interface device host system. In other embodiments, a configuration of a scheduled test of the network cable is completed while network activity is suspended and held until the scheduled tests are complete.

Some embodiments of the present invention may hereafter collectively refer to various network interface devices as a network interface card (NIC) for clarity and brevity; however, it is understood by one skilled in the art that embodiments of the present invention are not limited to NICs, and are applicable to current and future network interface devices that include the hardware and software components to perform testing of network cables as described herein.

Figure 1:
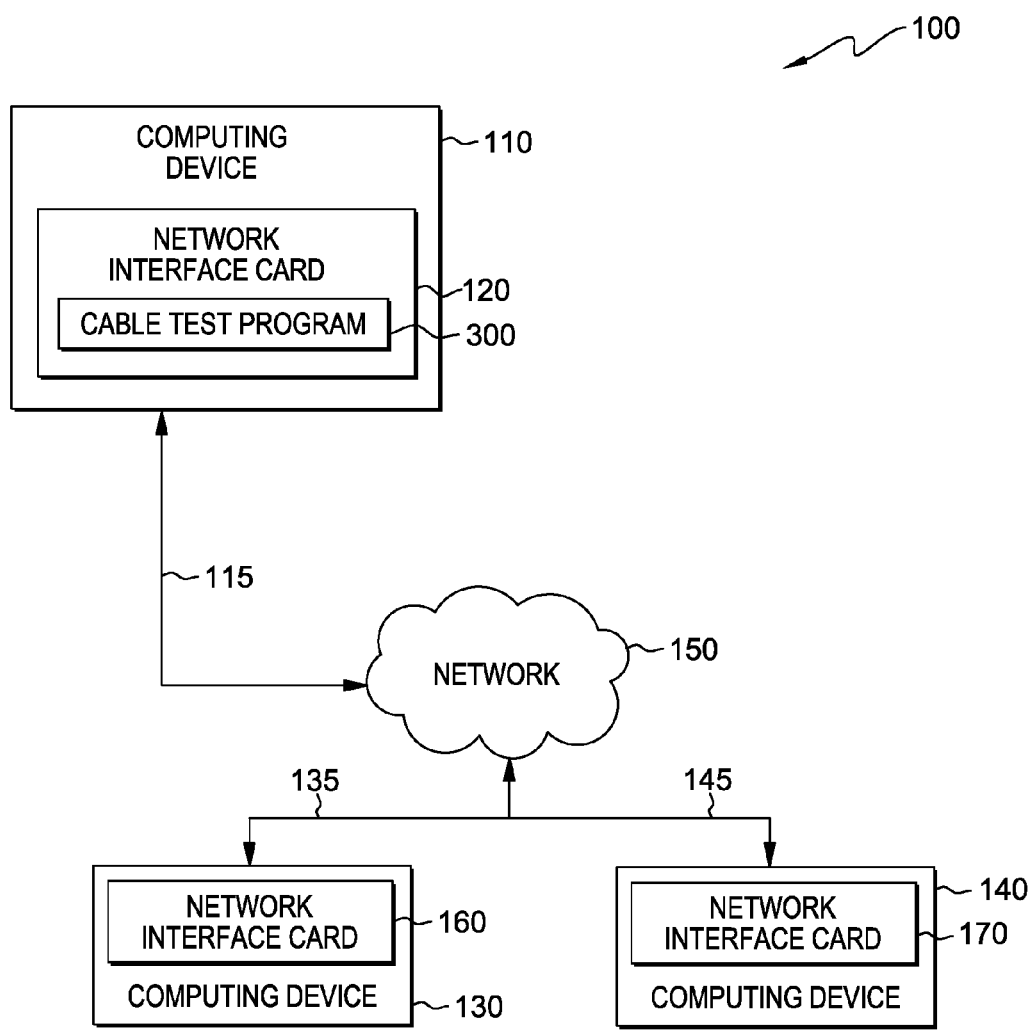
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 is a functional block diagram illustrating distributed data processing environment 100, in accordance with an embodiment of the present invention. Distributed data processing environment 100 includes, computing device 110, computing device 130, and computing device 140, all interconnected via cables 115, 135, 145, and network 150. Computing device 110 includes network interface card 120, depicted as including cable test program 300. Network interface card 120 and cable test program 300 will be discussed in more detail in reference to FIG. 2. Computing devices 130 and 140 are depicted as including network interface cards 160 and 170, respectively. In some embodiments of the present invention, network interface cards 160 and 170 include the hardware and software instructions of cable test program 300 (not shown), enabling testing of cables 135 and 145 respectively.

Network 150 can be, for example, a local area network (LAN), a telecommunications network, a wide area network (WAN), such as the Internet, a virtual local area network (VLAN), or any one or combination that includes wired and optical connections. In general, network 150 can be any combination of physical connections and protocols that will support communications between computing devices 110, 130, and 140, and the operation of cable test program 300, within distributed computer processing environment 100, in accordance with embodiments of the present invention.

Cable 115, cable 135, and cable 145 are network transmission cables that connect network interface cards of computing devices 110, 130, and 140, respectively, to network 150. Cable 115 is connected at a first end to network interface card 120, and connected to a network device associated with network 150 at a second end. Cable 135 is connected at a first end to network interface card (NIC) 160 of computing device 130, and to a network interface device of network 150 at a second end. Similarly, cable 145 is connected at a first end to network interface card (NIC) 170 of computing device 140, and connected to a network interface device of network 150 at a second end. Network cables 115, 135, and 145 can be copper wire based Ethernet cables of a designated standard, coax cables, token ring cables, fiber optic cables, or any cable of composition and format capable of transmitting digitized data from one component of a network to another component of the network, and capable of connection to a network interface device, for example, a network interface card.

Computing devices 110, 130, and 140 may be a desk top computing device, a rack mounted computing device, a blade server, a management server, a mobile computing device, or any other electronic device or computing system capable of performing program instructions, and receiving and sending data. In other embodiments, computing device 110 may represent a computing system utilizing multiple computers as a server system, such as in a cloud computing environment. In yet other embodiments, computing device 110 can be a laptop computer, a tablet computer, a netbook computer, a personal computer (PC), a desktop computer, a personal digital assistant (PDA), a smart phone, or any programmable electronic device capable of communicating with computing devices 130 and 140 via network 150. In another embodiment, computing device 110 can be a computing system utilizing clustered computers and components (e.g., database server computer, application server computers, etc.) that act as a single pool of seamless resources when accessed within distributed computer processing environment 100. Computing devices 110, 130, and 140 may include internal and external hardware components, as depicted and described with reference to FIG. 4.

Figure 2:
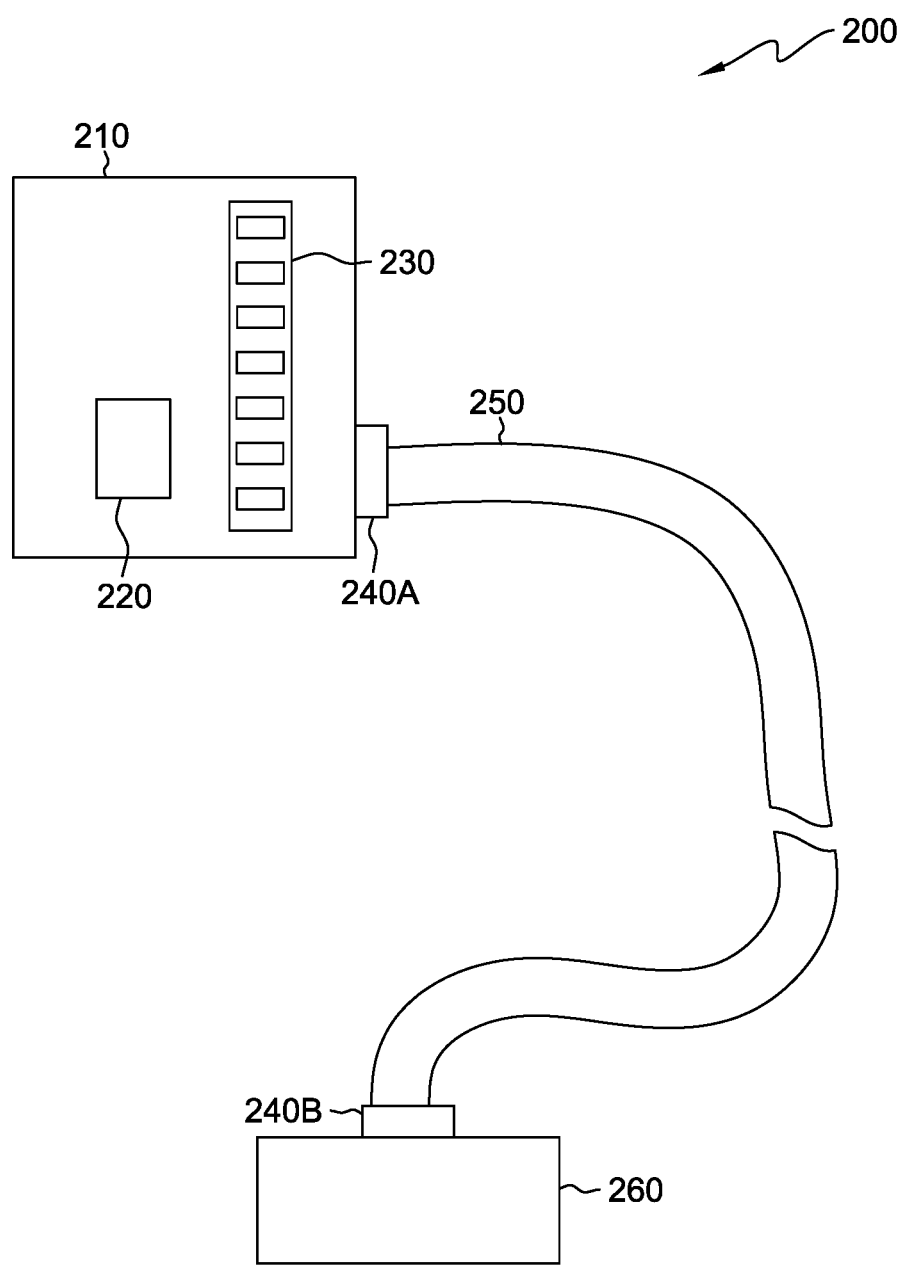
FIG. 2 is a functional block diagram of a network interface device connected to a network cable and capable of performing tests on the connected cable, in accordance with an embodiment of the present invention.

FIG. 2 is a functional block diagram of cable-connected, network interface devices 200, in accordance with an embodiment of the present invention. Cable connected network interface devices 200 includes NIC 210, which includes processor 220, memory 230, and connector 240, as well as network interface device 260. NIC 210 is connected at a first end to cable 250, by way of connector 240A, and network interface device 260 is connected to a second end of cable 250 by way of connector 240B.

NIC 210 includes the hardware and software to send and receive network transmission and communication from a host system to which NIC 210 may be connected. NIC 210 also includes hardware and logic to perform one or more network cable tests, which in some embodiments of the present invention, are selected in configuration settings of NIC 210 and cable test program 300. In some embodiments of the present invention, processor 220 is an integrated component of NIC 210 and executes instructions to test the connection of cable 250 to NIC 210, as well as testing the performance of network transmission via cable 250. In some embodiments, the tests include connectivity verification and bandwidth transmission rate measurements that include bandwidth capacity baseline and maximum bandwidth measurements, for the network cable. Processor 220 executes the tests of cable 250 and the tests of connections between connector 240A and 240B with cable 250. The tests performed by processor 220 may be supported by additional hardware, such as test-performing and results monitoring chips and circuitry, integrated as part of NIC 210.

In other embodiments, processor 220 may be a processor of a host system to which NIC 210 is connected (not shown). Processor 220 performs testing of cable 250, for example, continuity, bandwidth capacity, and performance testing. Processor 220 also performs connectivity testing between cable 250 and connectors 240A and 240B, and NIC 210 and network interface device 260, using the additional hardware and software associated with NIC 210 to perform the tests. Processor 220 sets configuration data associated with the execution of tests, storage of test results and the formatting and presentation of test result reports.

In some embodiments of the present invention, memory 230 is a memory module integrated as part of NIC 210, which is used to store cable test program 300, configuration data for cable testing, test results, and report configurations. In other embodiments, memory 230 may be a dedicated memory component of the host system to which NIC 210 is connected. Processor 220 accesses memory 230 to operate cable test program 300, perform testing, and store testing results.

Cable 250 connects at a first end to NIC 210 via connector 240A, and cable 250 connects at a second end to network interface device 260 via connector 240B. In some embodiments of the present invention, cable 250 is a twisted pair wire cable, such as an Ethernet cable. Cable 250 may be shielded to protect against interference, and may have performance capabilities matching designated standards, such as a category 3, 5e, 6, or 7 cable. In other embodiments, cable 250 may be a coax cable. In yet other embodiments, cable 250 is a fiber optic cable. In some embodiments of the present invention cable 250 is any cable capable of transmitting digitized data from NIC 210 to another network interface device, such as network interface device 260.

Connectors 240A and 240B are connected to respective ends of cable 250 and include a standard connector configuration corresponding to the cable type of cable 250. For example, connectors 240A and 240B may be optical connectors for a fiber optic cable 250, or alternatively, connectors 240A and 240B may be RJ-45 connectors for Ethernet category 5e cable 250.

In some embodiments of the present invention, processor 220 initiates a set of tests that are performed on cable 250 and connectors 240A and 240B, connected to NIC 210 via connector 240A. The set of tests are initiated during a period of time in which the network activity over cable 250 is idle. Cable test store program 300, operating on processor 220, suspends the set of tests in the event of detecting network activity associated with cable 250. Subsequent to the completion of the detected network activity, test program 300 sends instructions to processor 220 to resume the set of tests on cable 250 and connectors 240A and 240B.

In other embodiments, processor 220 initiates a set of tests, which are scheduled to be performed on cable 250 and connectors 240A and 240B, and the scheduled tests are performed, with results received and stored, while network activity of the host system is halted. Subsequent to the completion of the scheduled set of tests, the network activity of the host system proceeds.

Figure 3:
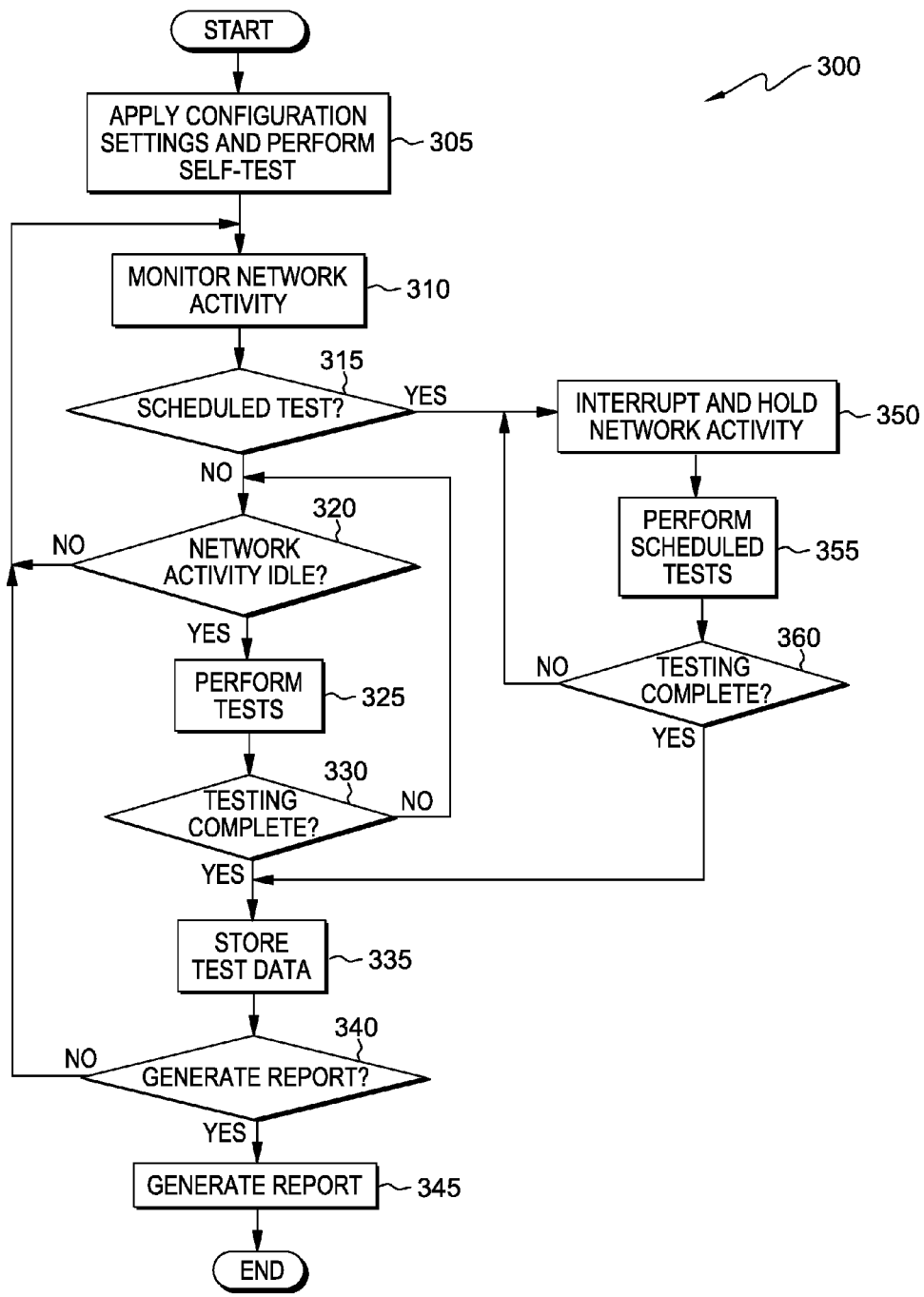
FIG. 3 illustrates operational steps of a cable test program, operating on a network interface device, within the data processing environment of FIG. 1, in accordance with an embodiment of the present invention.

FIG. 3 illustrates operational steps of cable test program 300, operating on a network interface device, within the data processing environment of FIG. 1, in accordance with an embodiment of the present invention. In some embodiments of the present invention, cable test program 300 is stored in memory included in a network interface device connected to a host computing device, for example, NIC 120 connected to computing device 110 as the host computing device. Cable test program 300 applies configuration settings and performs a self-test (step 305).

In some embodiments of the present invention, configurable settings, such as whether testing is to be scheduled or run during idle activity periods, giving priority to host network activity, are read from a storage file and applied to the operation of cable test program 300. Additional configurable settings may include selection of tests to be performed, such that usage scenarios in which base transmission bandwidth levels are critical can select particular performance-based testing, whereas low volume, non-critical usage may elect not to include performance-based testing. In some embodiments, configurable settings may include a frequency of testing, selection of formatting of reports, and preferences of report presentation. Additionally, test result and test report retention time may be selected, to manage test data as a function of storage capacity. In some embodiments of the present invention, cable test program 300 performs a self-test in which validation of host operating system, host status, and the operation of the network interface device are performed. If a self-test results in invalid or changed conditions, cable test program 300 may revert settings to a previously validated condition state, and may confirm the reverting of settings by a confirmation alert sent to the host computing device, and retain a record of reverting settings for review.

In some embodiments of the present invention, dual NICs are connected to a host computing system. The configuration settings of cable test program 300 include a designation to switch network operation from one of the dual NICs to the other NIC, based on test results indicating failed or unacceptable transmission performance, without intervention and without loss of network communication that would result from manual corrective action.

Cable testing program monitors network activity (step 310). The network interface device, for example NIC 110, performs network operations for the host computing device, for example, computing device 110 (FIG. 1). Cable test program 300 monitors the network communication activity, determining when activity is idle. For example, cable test program 300, stored on memory 230 and executed by processor 220 of NIC 210 (FIG. 2), monitors network communication transmitted and received via cable 250.

Having applied configuration settings and actively monitoring network activity, cable test program 300 determines whether there are scheduled tests (decision step 315), and determining that there are no scheduled tests (step 315, "NO" branch), cable test program 300 determines whether the network activity is idle (decision step 320). Cable test program 300 determines from configuration settings whether network cable testing is scheduled, or to be performed when network activity is detected to be idle. Determining that cable testing is not scheduled, cable test program 300 determines from network monitoring if the network activity is idle.

Determining that the network activity is not idle (step 320, "NO" branch), cable test program 300 continues to monitor network activity (step 310), delays testing of the cable, yielding priority to the network activity, and proceeds as described in the discussion of step 310 above. For example, cable test program 300, operating on NIC 120 (FIG. 1), monitors network activity, and determining the presence of network activity, cable test program 300 delays testing, and continues to monitor the network activity.

For the case in which cable test program 300 determines that network activity is idle (step 320, "YES" branch), cable test program 300 performs tests (step 325). Some embodiments of the present invention perform tests based on configurable settings and selections of available tests. Testing may include, but are not limited to one or combinations of connectivity, open/short test, wire map tests, attenuation tests, near-end cross talk tests, propagation delay tests, skew tests, and return loss tests. For example, cable test program 300 initiates testing based on idle network activity for NIC 210, and determines the tests to be run. In some embodiments of the present invention, testing is performed on connectors 240A and 240B, and cable 250 connected to NIC 210 at a first end and network interface device 260 at a second end of cable 250 (FIG. 2), based on configuration file selections and settings of NIC 210 and cable test program 300.

Having initiated testing of the network cable, cable testing program 300 determines whether testing is complete (decision step 330), and determining that cable testing is not complete (step 330, "NO" branch), cable testing program 300 loops back to determine if the network activity is still idle (decision step 320), and if there is network activity, cable test program 300 suspends testing, and yields priority to the communication transmissions over the cable until the network activity is idle. Determining the network activity to be idle, cable test program 300 resumes performing cable testing, and proceeds as described above in step 325.

Determining that testing of the cable is complete (step 330, "YES" branch), cable testing program 300 stores the test data results (step 335). In some embodiments of the present invention, test results associated with each of the one or more tests performed on the network cable are received and stored by cable test program 300. In some embodiments, cable test program 300 stores the test results in memory located on the NIC, and the results may include information regarding the date and time of the tests. In other embodiments, the test results may be stored in memory on the host computing device. For example, having determined that cable tests are complete for cable 250, connectors 240A and 240B, cable test program 300 executed by processor 220, receives and stores the test results in memory 230, located on NIC 210. In yet other embodiments, test results may be stored in memory on another device accessible via network 150. For example test results for cable 250, connectors 240A and 240B, may be sent to a pre-configured repository on any configured repository accessible via network 150.

Cable testing program 300 determines if a report is to be generated (decision step 340). Cable test program 300 accesses information included in configuration files to determine if a report of test results is to be generated. In some embodiments of the present invention, based on the configuration settings, determining that a report is to be generated (step 340, "YES" branch), cable test program 300 generates a report (step 345), formatted and presented based on the configurable conditions of generating a report, and ends. For example, cable test program 300 determines from a configuration file, that a report of test results are to be generated. The configuration file includes selections of tests, formatting of results, and options of actions to make the report available to an end user. Cable test program 300 includes results for selected tests, formats the results, which may include comparison of default or expected results based on the cable type being tested, and takes action on the report consistent with the configuration data. In one example, cable test program 300 presents a message on a display screen that a cable test report is available, and if a user wishes to view the report or save the report. In another example, cable test program 300 presents an alarm on a display screen, indicating that results of the tests performed cross a configurable threshold value, and the notification allows an attending user to determine if action needs to be taken. In some embodiments, having generated the report and responding to the message input, cable test program 300 ends. In other embodiments, after generating a report of test results, cable test program 300 may continue to monitor network activity (not shown) and repeat testing based on configuration settings, until the host computing device is powered down or rebooted.

For the case in which a report is not to be generated (step 340, "NO" branch), cable test program loops back and continues to monitor the network activity (step 310) and proceeds as described above. In some embodiments of the present invention, test results are stored and remain available for manually initiated report generation.

Referring back to the case in which cable test program 300 determines that cable testing has been scheduled (step 315, "YES" branch), cable test program 300 interrupts and holds the network activity (step 350). Configuration settings indicate to cable test program 300 that scheduled cable testing is to be performed at a scheduled time, time interval, or frequency. Cable test program 300 initiates scheduled cable testing by interrupting network activity, if any, and holding or preventing network activity while network cable testing is performed.

Having cleared network activity from the network cable, cable test program 300 performs the scheduled cable tests (step 355). Some embodiments of the present invention perform tests based on configurable settings and selections of available tests. For example, in some embodiments of the present invention, testing is performed on connectors 240A and 240B, and cable 250 connected to NIC 210 at a first end and network interface device 260 at a second end of cable 250 (FIG. 2), based on configuration file selections and settings of NIC 210 and cable test program 300.

Having initiated the scheduled cable testing, cable test program 300 monitors the testing to determine whether testing is complete (decision step 360), and determining that scheduled testing is not complete, cable testing program 300 loops back to hold network activity (step 350), and continue performing cable tests (step 355) until testing is complete.

Determining that scheduled cable testing is complete (step 360, "YES" branch), cable test program 300 stores the test data results (step 335) and proceeds as described above.

Figure 4:
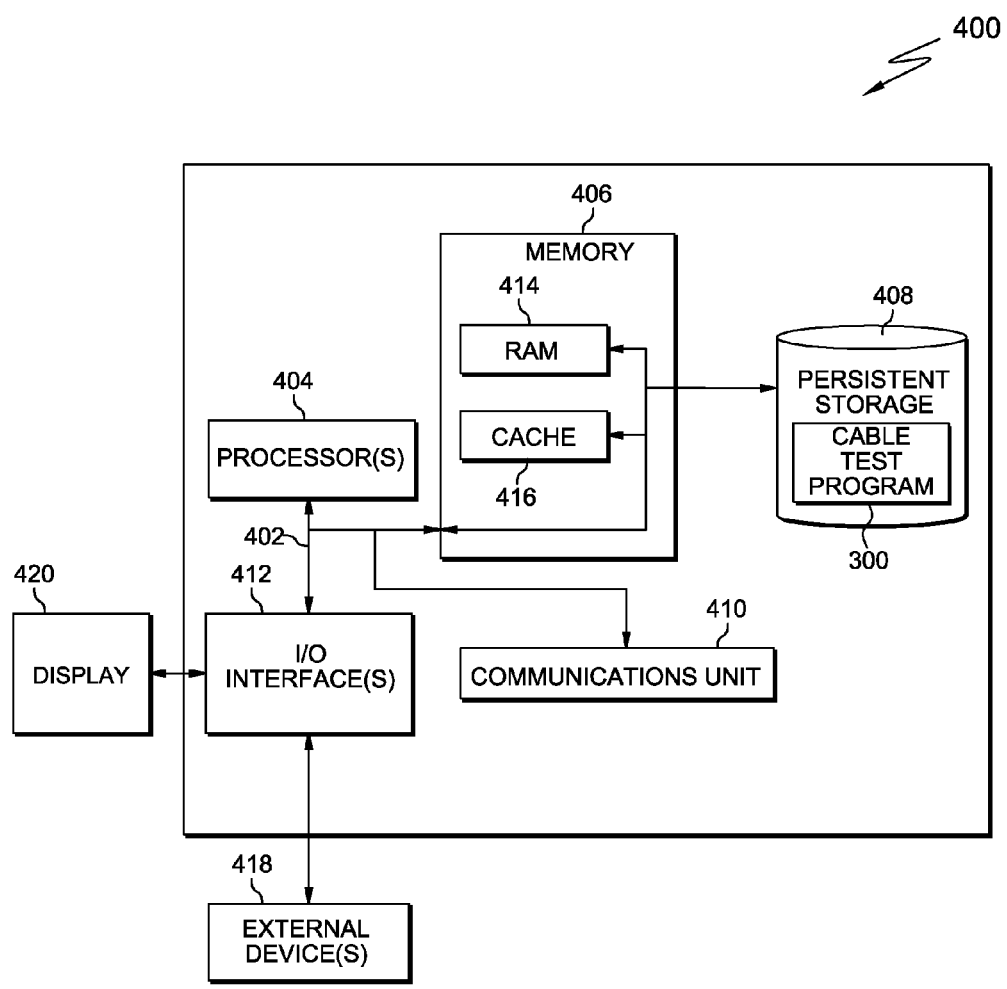
FIG. 4 depicts a block diagram of components of the computing device to which the device executing the cable test program is connected, in accordance with an embodiment of the present invention.

FIG. 4 depicts a block diagram of components of computing device 400, including a network interface device configured to execute cable test program 300, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Cable test program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards, or other network interface devices. Communications unit 410 may provide communications through the use of either or both physical and wireless communications links. Cable test program 300 may be downloaded to persistent storage 408 through communications unit 410.

I/O interface(s) 412 allows for input and output of data with other devices that may be connected to computing device 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., cable test program 300 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for non-disruptive integrated testing of network infrastructure, the computer system comprising:
    one or more computer processors;
    one or more computer readable storage media; and
    program instructions stored on the computer readable storage media for execution by at least one of the one or more processors, the program instructions comprising:
    program instructions for a first network interface device to perform a set of tests on a network cable of a network infrastructure, wherein a first end of the network cable is connected to the first network interface device of a host system by a first cable connector, and a second end of the network cable is connected to a second network interface device by a second cable connector, and wherein the set of tests includes connectivity verification of the first end and the second end of the network cable, a bandwidth capacity baseline measurement of the network cable, and a maximum bandwidth measurement of the network cable;
    wherein testing includes performing initiation of the sets of tests during a period of tin in which the network activity over the cable; and suspending the set of tests in the event of detecting network activity associated with said cable; and yields priority to the communication transmissions over the cable until said network activity is idle; subsequent to the completion of said detected network activity, sending instructions to the processor to resume the set of tests on said cable;
    program instructions to perform a self-test in which a determination of a host operating system, host status, and an operational status of the network interface device, are performed, and in response to the self-test resulting in changed conditions, reverting settings of the network interface device to a previously validated condition state, and confirm reverting of the settings by sending a confirmation alert to the host computing device, and retain a record of reverting settings for review;
    program instructions to suspend network activity which is received by the first network device of the host system, in response to initiating a set of tests on the network cable that are scheduled to be performed;
    program instructions to resume network activity which is suspended, in response to completion of the set of tests;
    program instructions to store results of the set of tests in a memory of the first network interface device; and
    program instructions to transmit the results of the set of tests from the memory of the first network interface device, to persistent storage of the host system.

* * * * *